July 14, 1959

H. W. BOYLAN 2,894,441

UNIVERSAL AIR DEFLECTOR OUTLET DEVICES

Filed Sept. 13, 1955

INVENTOR.
Henry W. Boylan
BY
J. W. Lovett
ATTORNEY

United States Patent Office 2,894,441
Patented July 14, 1959

2,894,441

UNIVERSAL AIR DEFLECTOR OUTLET DEVICES

Henry W. Boylan, Flint, Mich., assignor to General Motors Corporation, Detroit, Michigan, a corporation of Delaware Application September 13, 1955, Serial No. 534,012

3 Claims. (Cl. 98—2)

This invention relates to air outlet devices and more particularly to air outlet devices suitable for deflecting air in preselected directions in ventilating, heating or air conditioning systems.

In projecting or directing air into any enclosure such as a room in a building or other structure, it is often desirable that the direction of air flow be directed or suitably adjusted for optimum effect. Such is the case particularly with relation to vehicles in which outside, heated or cooled air is to be directed into the passenger compartments of the vehicles. Individual passengers have various preferences and desires as to how the air flow to which they are to be subjected should be introduced. Temperature conditions, the number of passengers affected, their mode of dress, speed of the vehicle, uniformity or lack of uniformity in the cooling, heating or ventilating effects are all factors contributing to the advisability of making suitable provision for easily controlling the general direction and proper diffusion of air admitted. For vehicle use it is also necessary that the control mechanism provided be simple and that all parts thereof be so arranged that vehicle vibration or air impingement forces to which the parts may be subjected will not cause undesirable sound effects. For many uses, vehicle or otherwise, it is obviously conducive to comfort if the air flow is discharged in a turbulent state while simultaneously being caused to flow in a general direction in efforts to eliminate pockets or zones of uncirculated or untreated air. Turbulent air does not produce the unpleasant feeling caused by drafts but definitely contributes to the feeling of well being of those affected.

An object of the present invention is to provide an improved outlet device which is universally adjustable for directing turbulent air in a selected general direction. Another object is to provide an outlet device with a single control means selectively to adjust the direction of a turbulent air discharge. Another object of the invention is to provide an outlet device suitable for vehicle use which is controlled by a single instrumentality as to direction of discharge and is so arranged as to be free of undesirable sound effects when subjected to vibration or the action of air flow.

To these ends, a feature of the invention comprises two sets of vanes in the form of louver strips and serving as deflectors with a single means for adjusting the angularity of the vanes to acquire a desired general direction of air discharge. Another feature is a frame supporting two cooperating sets of vanes with the latter resiliently positioned with respect to the frame by spring means to insure noiseless operation. Another feature is a grille arrangement of vanes extending across a discharge opening and adjustable by a knob to affect a preselected general direction of turbulent air flow.

These and other important features of the invention will now be described in detail in the specification and then pointed out more particularly in the appended claims.

Figure 1:
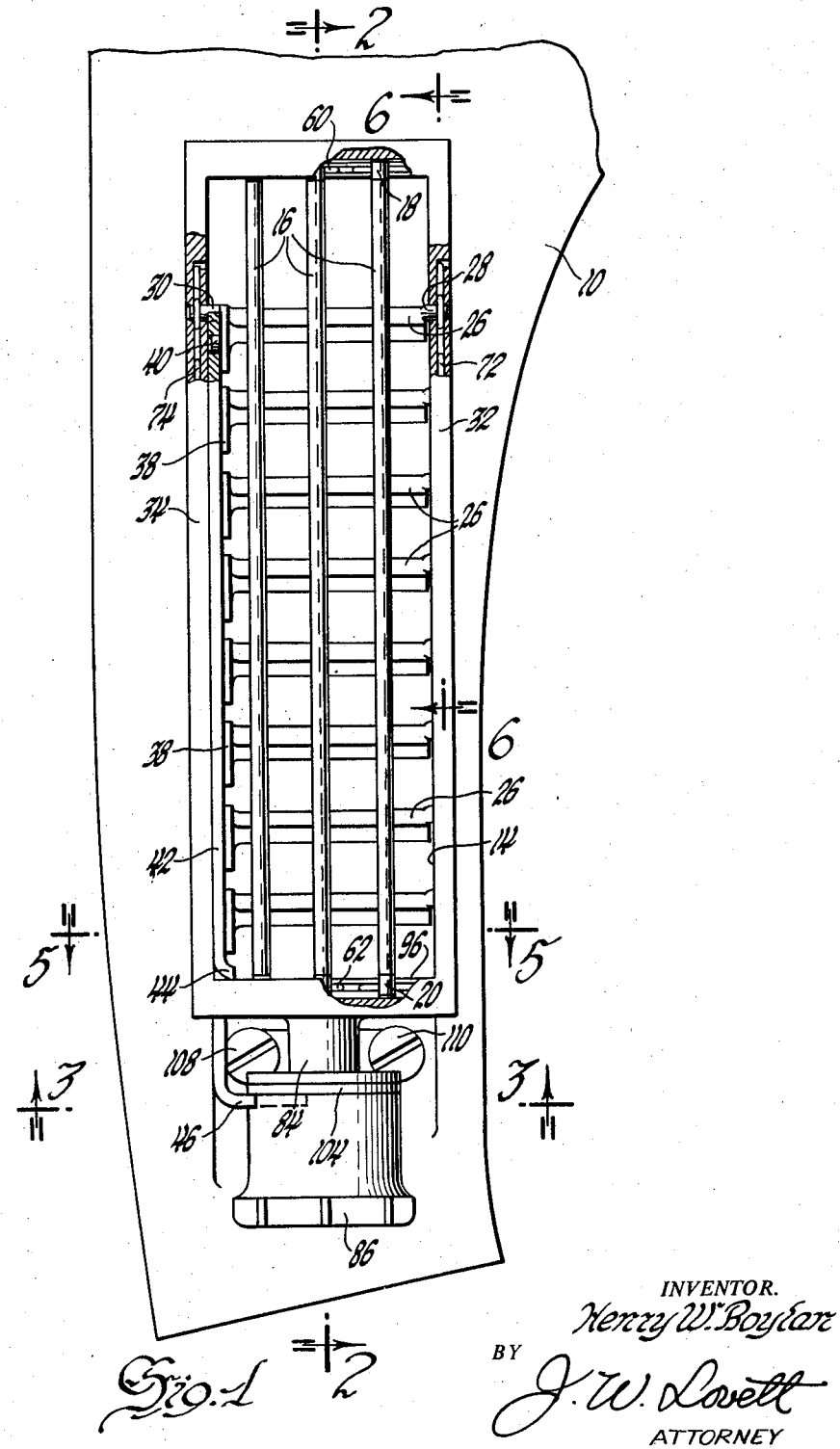
Fig. 1 is an elevation view of an air outlet device embodying the principles of the present invention, some parts being broken away or in section better to illustrate the construction.
Figure 2:
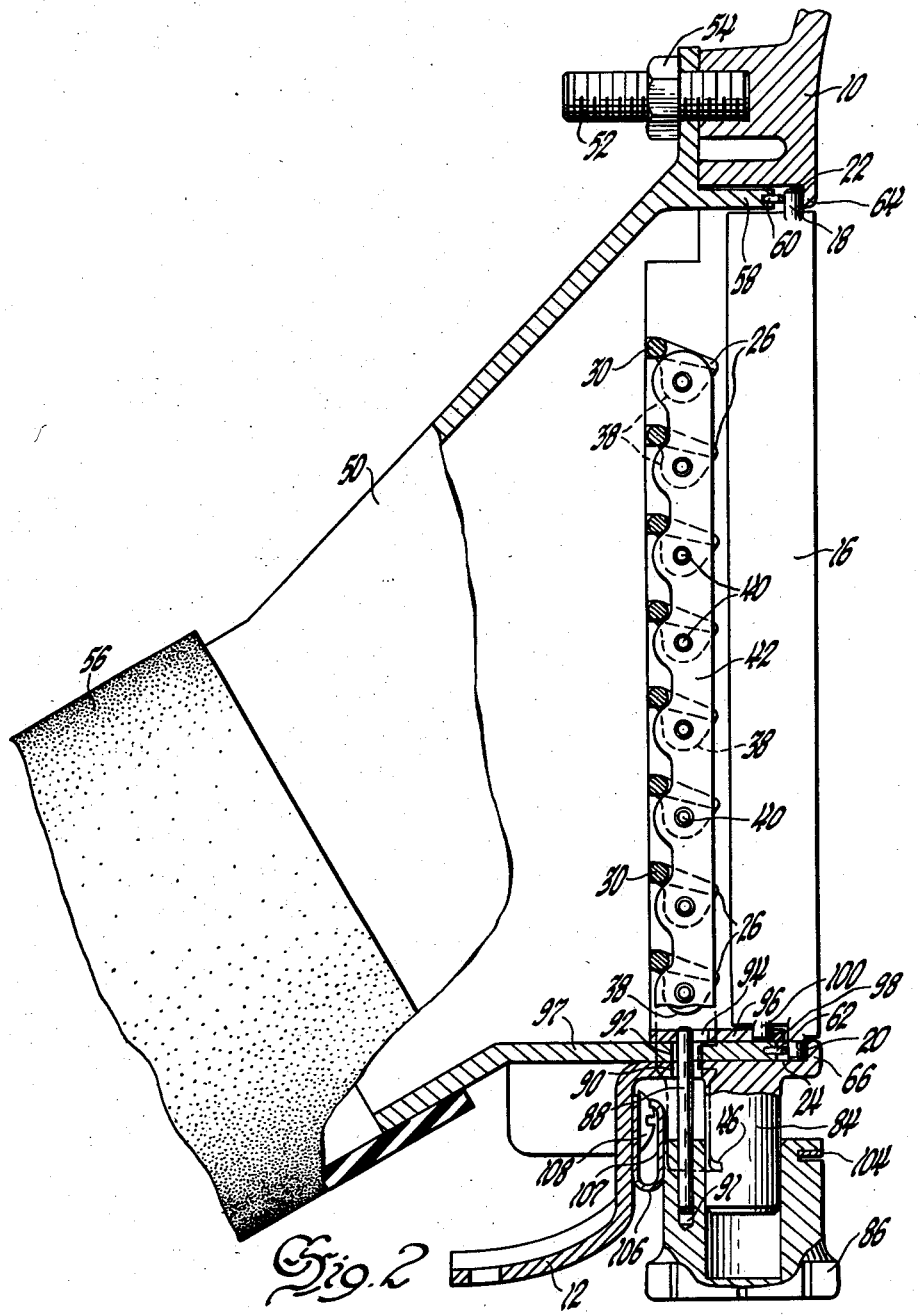
Fig. 2 is a side view of the device shown in Fig. 1 but partly in section as viewed in the direction of the arrows 2—2 of the latter figure.
Figure 3:
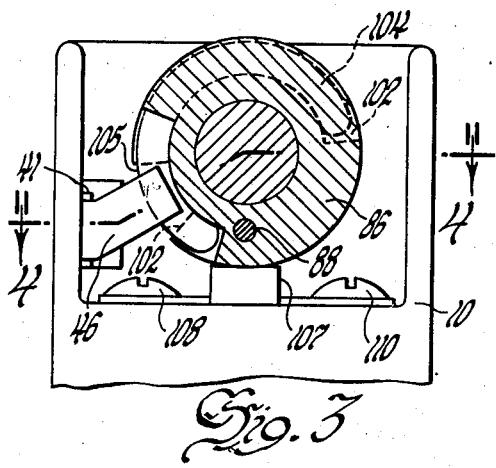
Fig. 3 is a sectional view looking in the direction of arrows 3—3 in Fig. 1.

The drawings depict an outlet device adapted for installation in the left-hand end of a vehicle instrument panel. It will be appreciated that a similar outlet device may be placed in any suitable location for discharge of air into a compartment and in the case of a vehicle experience has found that use of outlet devices at opposite ends of the instrument panel and to the opposite hand is eminently satisfactory for proper circulation of air to promote passenger comfort. As the present invention pertains to the outlet device per se, the description herein is confined to only one such device.

The drawings show an elongated or vertical frame 10 which is adapted by means of a lower perforated flange 12 and other means, not shown, to be attached to the left-hand end of an instrument panel in a motor vehicle. This frame is provided with a vertically elongated air discharge opening 14. A set of three vertical vanes 16 extend across the opening 14 and each vane 16 has integral trunnions 18 and 20 which are journaled in recesses 22 and 24, respectively, formed in the horizontal portions of the frame 12 which define the opening 14.

Also extending across the opening 14, but in a horizontal direction, is a set of eight parallel vanes 26. Each of these vanes is provided with integral trunnions 28 and 30 journaled in opposed wall portions 32 and 34 forming parts of the frame 10. At the left-hand end of each vane 26 is provided a depending ear 38 and integral with this ear is an outwardly extending cylindrical bearing portion 40. Each bearing portion 40 is journaled within a vertical flat member 42 and terminates so as to clear or move freely with respect to the inside wall of the wall portion 34. The vertical strap member 42 serves operatively to connect all the vanes 26 and portions thereof are bent inwardly as at 44 and 46.

Communicating with the opening 14 and extending from the rear side thereof is a funnel-shaped member 50 which is attached to the frame 10 by means such as the stud 52 with its nut 54. The member 50 is connected at its other and reduced end to a flexible conduit 56 which leads from a supply of treated or outside air as the heating, ventilating or air conditioning system of the vehicle.

A forwardly extending rim 58 of the member 50 extends within the frame 10 to define an opening registering with the opening 14 in the frame.

Figure 5:
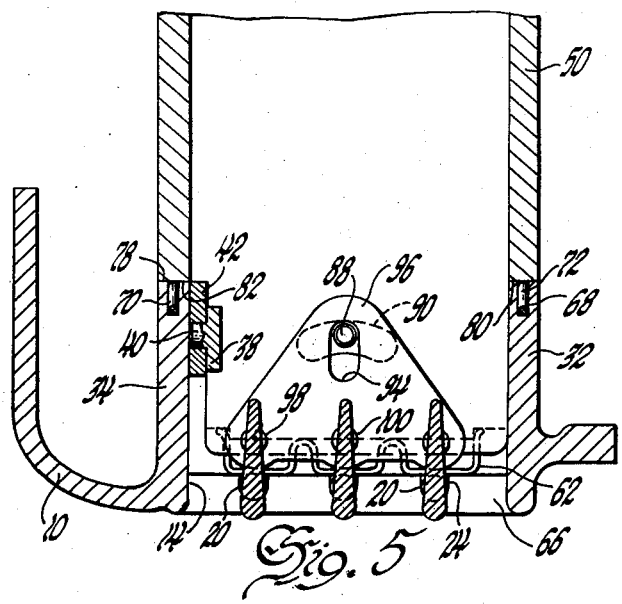
Fig. 5 is a sectional view looking in the direction of arrows 5—5 in Fig. 1.
Figure 6:
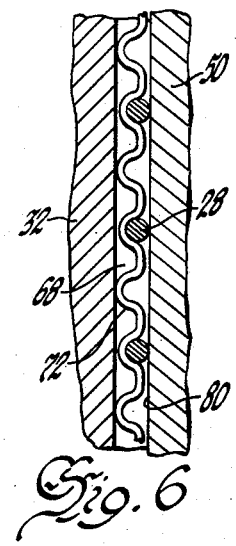
Fig. 6 is a sectional view showing a detail of the construction and looking in the direction of arrows 6—6 of Fig. 1.

The horizontal portions of the rim 58 are recessed to receive spring members 60 and 62. The spring member 60 is arranged resiliently to engage the trunnions 18 and hold them firmly against a forward lip 64 partially defining the recesses 22 and formed on the frame 10. The spring 62 acts similarly in holding trunnions 20 tightly within the recesses 24 defined by a lip 66 of the frame. The wall portions 32 and 34 of the frame are recesed as at 68 and 70 (Fig. 5) to retain spring members 72 and 74, respectively. These spring members act as do spring members 60 and 62 but resiliently urge the trunnions 28 and 30 against the edges 80 and 82 of the member 50.

Integral and depending from the frame 12 is a short cylindrical shaft 84. Upon this shaft is journaled a knob 86. The knob is also slidable in a vertical direction on the shaft 84. A vertical pin 88 is arranged with its lower end in a more 91 formed in the knob 86. The upper portion of this pin extends upwardly through an arcuate slot 90 formed in the frame 10 and a second arcuate slot 92 formed in the member 50. The upper extremity of the pin 88 extends within a straight slot 94 formed in a triangular plate 96. This plate rests upon the horizontal interior surface 97 of the member 50 and is provided with openings 98 to serve as journals for three cylindrical portions 100. Each of the latter is integral with a vertical vane 16 and spaced from the trunnion 20 of that vane.

Figure 4:
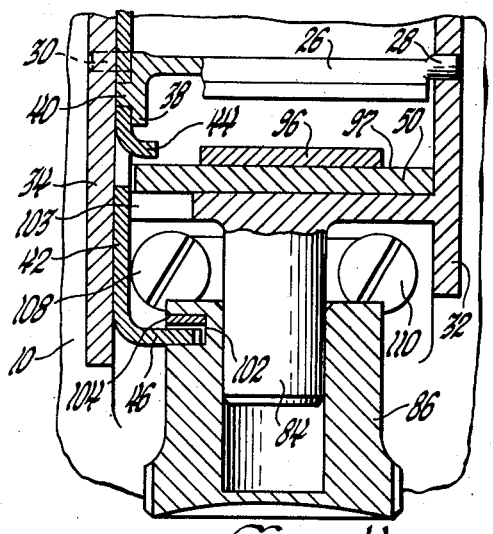
Fig. 4 is a sectional view of the lower portion of the device and looking in the direction of arrows 4—4 in Fig. 3.

As will be clearly seen in Fig. 4, the portion 44 of the flat member 42 extends inwardly and over the horizontal wall or surface 97 of the member 50 whereas the portion 46 extends inwardly and into a recess 102 describing an arc of 98° formed in the knob 86. The ends of this recess constitute stops determining the rotative angle of the knob. Conveniently, a U-shaped spring member 104 is utilized to retain the portion 46 properly within the recess 102. An opening 103 is formed in the frame 10 to aid in installing the flat member 42. A short arcuate cut 105 is made in the top of the knob 86 for the same purpose.

Interposed between the side of the knob 86 and the main body of the frame 10 is a spring member 106 a vertical leg 107 of which is adapted to bear against the knob 86. The member 106 is held to the frame 12 by means of two screws 108 and 110.

In operation and assuming that suitably treated air is being supplied from the conduit 56, air is discharged from the opening 14 through the grille-like arrangement of the vanes 16 and 26. The grille-like arrangement causes a diffusion of the air but the inclination or angularity given to the vanes obviously determines the general direction of air flow discharge. This direction may be varied horizontally by turning the knob 86 in either direction (limited by the extent of the slot 102) in which event the pin 88 will cause the plate 96 to slide laterally and thereby rotate the vanes 16 about the trunnions 18 and 20. In the event that the direction of air discharge is to be varied vertically, then the knob 86 is moved up or down on the shaft 84 and the strap member 42 causes the vanes 26 to rotate on the horizontal trunnions 28 and 30.

From the above, it may be seen that universal adjustment as to the angularity in direction of air discharge may be had by manipulation of the single control knob 86. Noises due to vibration or to the impingement of the air are minimized because of the resilient mounting of the vane trunnions and the spring 106 aids in maintaining a selected adjustment.

I claim:

1. An air deflector outlet device adapted for use on a vehicle instrument panel, said device comprising a frame defining a horizontally directed opening, two sets of vanes pivotally mounted in said opening and in substantially parallel planes to form a grille across the opening, each vane of one of said sets extending in a plane transverse to each vane of the other set, a cylindrical shaft depending from and integral with said frame, a knob rotatably and slidably mounted on said shaft, and means connecting each set of vanes to said knob whereby rotation of said knob rotates the vanes of one set and linear movement of said knob by sliding of the latter on said shaft rotates the vanes of the other set.

2. An air deflector outlet device as set forth in claim 1 including spring means retaining the sets of vanes in said frame to prevent rattling, and the knob being linearly slidable along said shaft to adjust the angularity of one set of vanes independent of and simultaneous with adjustment of the other set of vanes.

3. An air deflector outlet device adapted for use on a vehicle instrument panel, said device comprising a rectangular frame defining a discharge opening, two substantially parallel sets of vanes pivoted to said frame and cooperating to form a grille across said opening, a shaft extending in a direction normal to one side of said frame and fixed thereto, a knob journaled on said shaft, means linking said knob to one of said sets of vanes to rotate them by rotation of said knob on said shaft, and means connecting said knob to the other set of vanes to rotate them by linear movement of said knob along the length of said shaft.

References Cited in the file of this patent

UNITED STATES PATENTS

| 2,634,670 | Simons | Apr. 14, 1953 |
| 2,685,246 | Saunders | Aug. 3, 1954 |
| 2,729,158 | Wilfert | Jan. 3, 1956 |

FOREIGN PATENTS

| 718,400 | Great Britain | Nov. 10, 1954 |